No. 807,388. PATENTED DEC. 12, 1905.
C. M. LEFFINGWELL.
ATTACHMENT FOR FRUIT CANS AND JARS.
APPLICATION FILED JULY 19, 1904.

WITNESSES:
Jos. A. Ryan
Amos W Hark

INVENTOR
CLASSON M. LEFFINGWELL.
BY Munn & Co.
ATTORNEYS

UNITED STATES PATENT OFFICE.

CLASSON M. LEFFINGWELL, OF LITTLEFALLS, MINNESOTA.

ATTACHMENT FOR FRUIT CANS AND JARS.

No. 807,388.  Specification of Letters Patent.  Patented Dec. 12, 1905.

Application filed July 19, 1904. Serial No. 217,278.

*To all whom it may concern:*

Be it known that I, CLASSON M. LEFFINGWELL, a citizen of the United States, and a resident of Littlefalls, in the county of Morrison and State of Minnesota, have invented an Improved Attachment for Fruit Cans and Jars, of which the following is a specification.

My invention is an improvement in attachments for jars for holding fruit submerged below the surface of the juice and also for extracting mold therefrom should any be formed.

The details of construction, arrangement, and operation of the attachment are as hereinafter described, reference being had to the accompanying drawings, in which—

Figure 1:
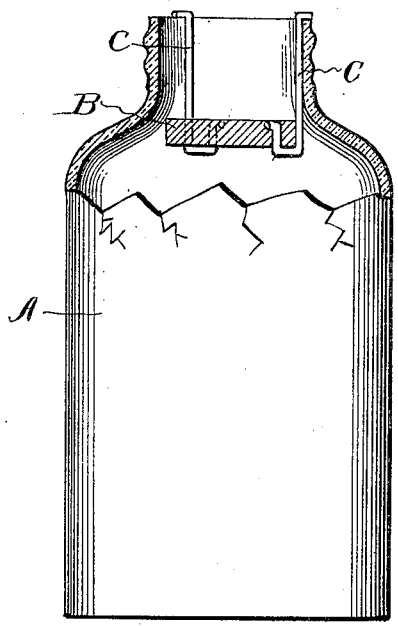
Figure 2:
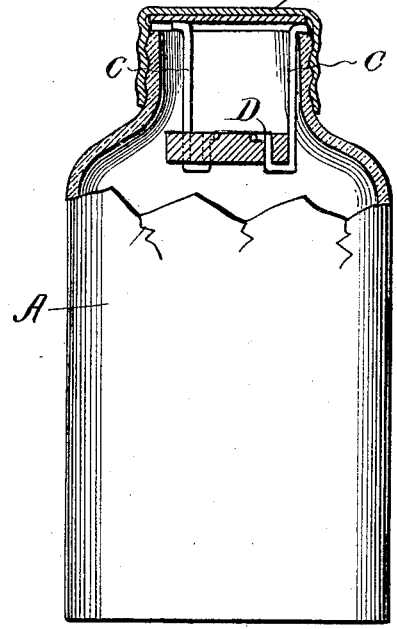
Figure 3:
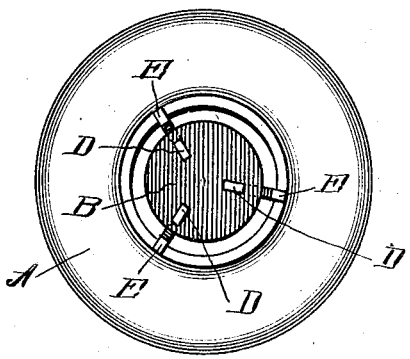
Figure 4:
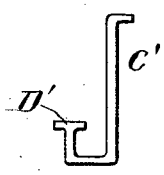

Figure 1 is a side view of a glass jar without cap or cover, a portion of the side thereof being broken away to exhibit my improved attachment in place therein. Fig. 2 is a side view of a similar jar with a portion in section, together with my improved attachment, which is also in section. Fig. 3 is a plan view of an open jar provided with my attachment as exhibited in Fig. 1. Fig. 4 is a side view of a modified form of a hanger or support forming a portion of my improved attachment.

Referring in the first instance to Figs. 1, 2, and 3, A indicates a jar of the usual construction, which is provided with the usual screw-cap A'. My improved attachment consists of a thick disk or plate B and hangers or supports C therefor. As shown, the disk B is suspended by the hangers horizontal in the upper portion or neck of the jar A, the hangers depending from the top of the latter and being suitably connected with the body of the disk—that is to say, the hangers are formed of wire which is bent at several angles, thus forming a horizontal top portion E, which rests upon the edge of the neck of the jar, while the other end is also bent horizontally after passing up through the disk B from the under side. In Fig. 3 the parallel lines indicate the direction of grain of the wooden disk, and it will be seen that the three hangers C are so attached and arranged with reference thereto that they in each case extend across the grain, whereby danger of splitting the wood is avoided. As shown, the disk or plate B has considerable thickness, and it is preferably circular and necessarily of such size that it may be inserted through the neck of the jar. It may be constructed of other material than wood, since one of its functions is to hold the fruit depressed beneath the surface of the juice in the jar, and for this purpose it serves as a weight. In Fig. 4 I show a modified form of hanger C', whose lower terminal D' is constructed in T form instead of L form, as in Figs. 1, 2, and 3.

In using my improved attachment a jar is filled with fruit to within one inch of the top, the fruit being packed closely and as little juice as possible being used. When the disk or weight B is inserted in place, the upper ends E of the several hangers rest upon the top of the jar-neck, as shown. The jar is then filled with juice and the top A' screwed on. The weight B will prevent the fruit rising, as it ordinarily tends to do, so that if mold appears on the surface of the liquid within it will not have access to the fruit and thus injure the same. In brief, my improved attachment holds fruit submerged in the juice and also serves as a mold-extractor in case mold forms, since it may be readily lifted out of the jar with the mold adhering thereto.

By the arrangement of the three hangers constructed in the form and attached to the disk in the manner shown and described I produce a device which is distinguished by cheapness and lightness as compared with those which are constructed solid, as usual heretofore.

What I claim is—

1. The improved jar attachment for the purpose specified, comprising a disk and three wire hangers, having the angular form specified, their lower ends being rigidly connected with the disk and their upper ends diverging laterally, as shown and described.

2. The combination, with a can or jar, of an attachment for the purpose specified, comprising a disk made of wood and a series of wire hangers adapted to rest on the top edge of the can or jar and having their lower ends extended inward and connected with the disk, such ends being arranged crosswise of the grain of the wood, as and for the purpose specified.

In testimony whereof I have signed my name to this specification in the presence of two subscribing witnesses.

CLASSON M. LEFFINGWELL.

In presence of—
 N. N. BERGHEIM,
 SPIRIT JACOB VASALY.